(12) United States Patent
Chu et al.

(10) Patent No.: US 9,719,414 B2
(45) Date of Patent: Aug. 1, 2017

(54) APPARATUS FOR SUPPORTING WASTE GATE MODULE

(71) Applicants: Hyundai Motor Company, Seoul (KR); Kia Motors Corp., Seoul (KR)

(72) Inventors: Dong Ho Chu, Ansan-si (KR); Do Geun Jung, Suwon-si (KR); Sung Kwan Bae, Cheonan-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 69 days.

(21) Appl. No.: 14/741,063

(22) Filed: Jun. 16, 2015

(65) Prior Publication Data

US 2016/0169097 A1 Jun. 16, 2016

(30) Foreign Application Priority Data

Dec. 15, 2014 (KR) ........................ 10-2014-0180636

(51) Int. Cl.
*F02D 23/00* (2006.01)
*F02B 39/16* (2006.01)
*F02B 37/16* (2006.01)
*F02B 37/18* (2006.01)

(52) U.S. Cl.
CPC .............. *F02B 39/16* (2013.01); *F02B 37/16* (2013.01); *F02B 37/183* (2013.01); *F02B 2039/164* (2013.01); *Y02T 10/144* (2013.01)

(58) Field of Classification Search
CPC .. F02B 2039/164; F02B 37/16; F02B 37/183; F02B 39/16
See application file for complete search history.

(56) References Cited

U.S. PATENT DOCUMENTS

| 4,256,019 A * | 3/1981 | Braddick .............. F02B 37/186 60/602 |
| 4,492,519 A * | 1/1985 | Owen .................. F01D 17/105 251/300 |
| 4,611,465 A * | 9/1986 | Kato ...................... F02B 37/02 60/602 |
| 4,655,040 A * | 4/1987 | Parker .................. F02B 37/183 251/25 |
| 6,658,846 B1 * | 12/2003 | McEwan .............. F01D 17/105 60/602 |
| 6,662,708 B2 * | 12/2003 | Hosny .................... F01B 17/00 92/101 |
| 2005/0217266 A1 * | 10/2005 | Noelle .................... F02B 37/24 60/602 |
| 2007/0051106 A1 * | 3/2007 | Jones .................... F02B 37/186 60/602 |

(Continued)

FOREIGN PATENT DOCUMENTS

| JP | 2009-174326 A | 8/2009 |
| JP | 2011-132820 A | 7/2011 |

(Continued)

*Primary Examiner* — Jesse Bogue
(74) *Attorney, Agent, or Firm* — Morgan Lewis & Bockius LLP

(57) ABSTRACT

An apparatus for supporting a waste gate module includes a support bracket connecting the waste gate module and a turbocharger housing, and a coupling protrusion formed on a face of the support bracket and that faces the waste gate module, where the coupling protrusion has an end coupled to the waste gate module.

11 Claims, 1 Drawing Sheet

(56) References Cited

U.S. PATENT DOCUMENTS

2013/0340426 A1* 12/2013 Bogner ................ F01D 17/105
  60/602
2016/0024990 A1*  1/2016 Maier ................ F01N 13/1811
  60/323
2016/0169090 A1*  6/2016 Murphy ................ F02B 37/186
  415/144

FOREIGN PATENT DOCUMENTS

| KR | 10-2006-0037719 A | 5/2006 |
| KR | 10-2008-0039085 A | 5/2008 |
| KR | 10-2012-0015386 A | 2/2012 |

* cited by examiner

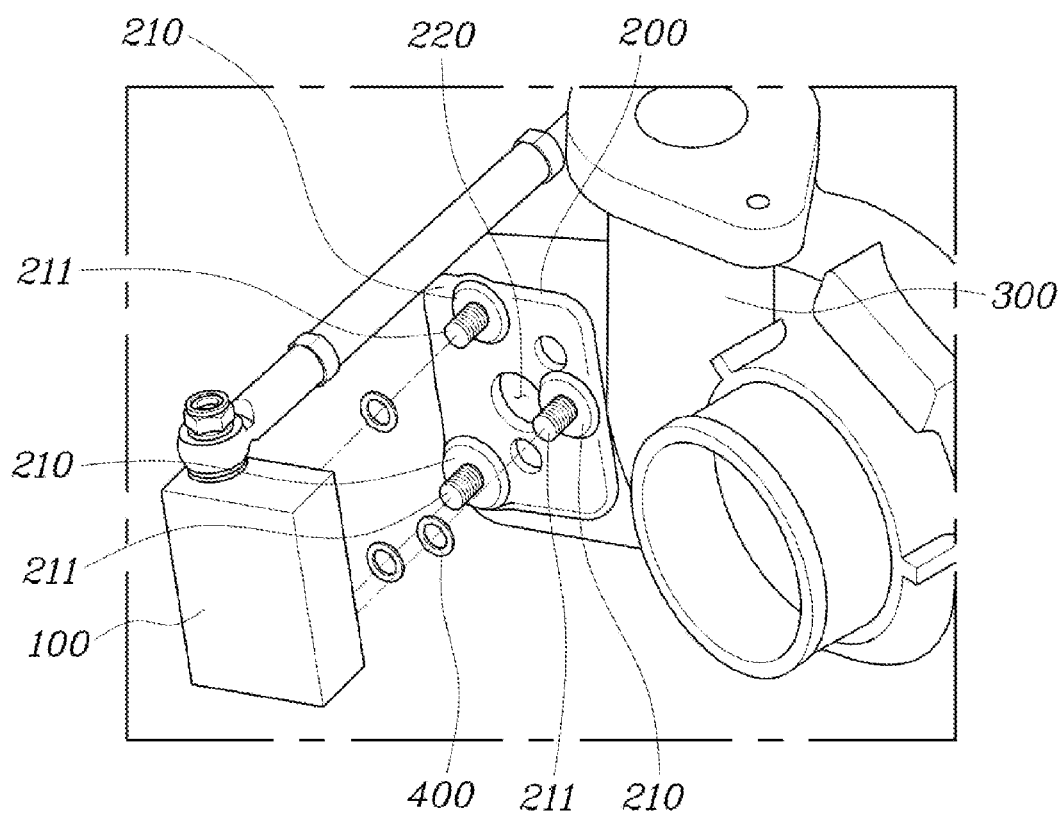

APPARATUS FOR SUPPORTING WASTE GATE MODULE

CROSS-REFERENCE(S) TO RELATED APPLICATIONS

The present application claims priority to Korean Patent Application Number 10-2014-0180636 filed Dec. 15, 2014, the entire contents of which is incorporated herein for all purposes by this reference.

BACKGROUND OF THE INVENTION

Field of the Invention

Various embodiments of the present invention relate to an apparatus for supporting a waste gate module.

Description of Related Art

A turbo charger for an internal combustion engine is an apparatus for recovering the pressure and heat energy of exhaust gas and compressing air flowing into an engine by driving a turbine using the exhaust energy of the engine, compressing air using a compressor placed in the same axis as the turbine, and supplying the compressed air to the engine. The turbo charger, together with an intercooler for cooling the temperature of suction air, is used in most of diesel engines in order to improve output. A common turbo charger includes a turbine wheel and a compressor wheel. Exhaust gas discharged through the exhaust port of the engine rotates the turbine wheel of the turbo charger. As a result, the compressor wheel connected to the turbine wheel through a connection shaft is rotated. Furthermore, the compressor wheel is installed in the intake port of the engine, and air flowing into the engine is compressed by the rotation of the compressor wheel.

In such a turbo charger, if the RPM of the engine is high or the capacity of the engine is great, air excessively compressed by the compressor is supplied to the combustion chamber in view of an internal structure. As a result, there is an adverse effect in that engine output is decreased due to the driving of the turbo charger because a ratio of air within a combustion chamber is excessively increased compared to fuel.

In order to solve such a problem, if the RPM of the engine is high or the capacity of the engine is great, a waste gate is placed on the inlet side of the turbine housing (the turbine wheel is disposed within the turbine housing) of the turbo charger and a vent valve (or also called a bypass valve) for opening and closing the waste gate is installed. If excessively compressed air flows into the combustion chamber, the vent valve is driven so that part of exhaust gas is directly discharged without passing through the turbine wheel in order to reduce the RPM of the turbine wheel.

Such a conventional waste gate is a mechanical type and configured to operate by a vacuum difference between the intake side and the exhaust side. In recent years, an electronic waste gate for opening and controlling a vent valve using a separate motor is emerging in order to control an accurate and proper time when the vent valve is open.

In a conventional electronic waste gate, however, high heat generated by exhaust gas is transferred to an actuation module for driving the vent valve through the turbo charger because the actuation module is disposed close to the turbo charger. Accordingly, there is a problem in that the actuation module may break down or cause an error because a temperature of the actuation module exceeds an allowable temperature.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for supporting a waste gate module, which blocks or limits the transfer of heat generated by exhaust gas.

According to various aspects of the present invention, an apparatus for supporting a waste gate module may include a support bracket connecting the waste gate module and a turbocharger housing and a coupling protrusion formed on a face of the support bracket and that faces the waste gate module, the coupling protrusion having an end coupled to the waste gate module.

The support bracket may have one end integrated and coupled with the turbocharger housing.

A plurality of the coupling protrusions may be formed on a face of the support bracket.

Three coupling protrusions may be formed on one face of the support bracket at predetermined intervals, and the coupling protrusions may be disposed to correspond to the vertices of a triangular shape.

A cross section of the coupling protrusion may have a circular shape.

A bolt inserted into the waste gate module may protrude from and be disposed at a central part of an axial cross section of the coupling protrusion.

A plurality of grooves may be formed on the face of the support bracket in which the coupling protrusions are formed.

An insulator for insulation or anti-vibration may be further provided between faces of the coupling protrusion and the waste gate module which are coupled.

The insulator may have a circular shape.

The support bracket may be coupled to a compressor-side of a turbocharger in the turbocharger housing.

The waste gate module may be an electronic waste gate module and may include a driving motor for driving a waste gate valve and a control unit for driving the driving motor.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWING

THE FIGURE is a diagram illustrating an exemplary apparatus for supporting a waste gate module according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

THE FIGURE is a diagram illustrating the configuration of an apparatus for supporting a waste gate module in accordance with various embodiments of the present invention. The apparatus for supporting a waste gate module in accordance with various embodiments of the present invention includes a support bracket 200 and a coupling protrusion 210. The support bracket 200 connects a waste gate module 100 and a turbocharger housing 300. The coupling protrusion 210 is formed in a face that belongs to the support bracket 200 and that faces the waste gate module 100 and is configured to have an end coupled with the waste gate module 100.

More specifically, the turbocharger housing 300 may be the external wall part of a turbo charger for performing surcharging on an engine using the pressure of exhaust gas. The waste gate module 100 is an electronic type waste gate module and may be a control module for driving a waste gate valve provided on the exhaust side of the engine of the turbo charger. Accordingly, the waste gate module may include a driving motor for driving the waste gate valve and may further include a controller or a control device or both for driving the driving motor.

The support bracket 200 may have one end integrated and coupled with the turbocharger housing 300 and may have one end coupled with the compressor-side of the turbocharger housing 300. Accordingly, the vibration of the engine can be prevented from being directly transferred to the support bracket 200 because the support bracket 200 is coupled with the turbocharger housing 300. Furthermore, the transfer of heat to the waste gate module can be easily prevented because new external air flows into the compressor side of the turbocharger.

The support bracket 200 may be configured in the form of a panel that forms a face. A plurality of the coupling protrusions 210 may be formed on one face of the support bracket 200. The number and arrangement form of the coupling protrusions 210 may be set according to a designer's intentions based on various factors, such as the areas of the waste gate module 100 and the support bracket 200. For example, three coupling protrusions 210 may be formed on one face of the support bracket 200 at set intervals, and the coupling protrusions 210 may be disposed in such a way as to correspond to the vertex of a triangular shape.

The coupling protrusion 210 is protruded from one face of the support bracket 200 at a set height. Accordingly, the waste gate module 100 may be coupled with the coupling protrusion 210 in such a way as to come in contact with the protruded face of the coupling protrusion 210 and may be supported by the support bracket 200 without coming in contact with the entire one face of the support bracket 200. The height of the coupling protrusion 210 may be set in various ways according to a designer's intentions.

Furthermore, the coupling protrusions 210 are disposed to form a triangular shape when they are linked together. Accordingly, the coupling protrusions 210 can be stably coupled with the waste gate module 100 with respect to omni-directional vibration using a minimum number of the coupling protrusions 210.

An axial cross section vertical to the axial direction of the coupling protrusion 210 may be a circle. In this case, a load due to engine vibration and transferred heat can be prevented from being concentrated on a specific point of the coupling protrusion 210, vibration can be uniformly distributed to the entire coupling protrusion 210, and the stiffness of the coupling protrusion 210 can be enhanced.

Furthermore, a bolt 211 inserted into the waste gate module 100 is protruded and formed at the central part of the axial cross section of the coupling protrusion 210 so that the waste gate module 100 can be strongly coupled with the coupling protrusion 210 and can be guided and precisely installed at a predetermined point. In this case, a nut coupled with the bolt 211 may be provided within the waste gate module 100, or the bolt 211 may be coupled with the nut outside the waste gate module 100 through the waste gate module 100. Furthermore, the coupling between the bolt 211 and the waste gate module 100 may be performed in various ways in addition to the coupling of the bolt the nut.

A plurality of grooves 220 may be formed in the one face of the support bracket 200 in which the coupling protrusion 210 is formed. The grooves 220 may be formed in the remaining parts of the one face of the support bracket 200 other than the coupling protrusion 210. The grooves 220 may function to further widen a gap between the support bracket 200 and the waste gate module 100 and to block or limit exhaust heat, transferred through the turbocharger housing 300 and the support bracket 200, from being transferred to the waste gate module 100 when an insulating layer is formed in one face of the support bracket 200. The electronic type waste gate module 100 may malfunction or break down due to overheating if exhaust heat is directly transferred or the amount of heat transferred is excessive because it includes the driving motor and the control device for controlling the driving motor. Such a failure can be prevented by blocking or limiting the transfer of heat to the waste gate module 100.

In addition, an insulator 400 for insulation or anti-vibration may be further provided between faces where the coupling protrusion 210 and the waste gate module 100 are coupled. The insulator 400 may be made of various materials, such as a resin substance or a rubber substance, and may be configured to have a circle like a doughnut shape. Accordingly, the insulator 400 into which the bolt 211 has been inserted may perform the insulation and anti-vibration functions between the coupling protrusion 210 and the waste gate module 100.

Furthermore, the insulator 400 may be formed to have the same shape as the axial cross section of the coupling protrusion 210, but is not limited thereto and it may have various shapes and sizes. Furthermore, the insulator 400 may selectively perform the insulation or anti-vibration function or may perform both the insulation and anti-vibration functions and may perform additional functions.

In accordance with various embodiments of the apparatus for supporting a waste gate module of the present invention, the transfer of heat can be limited and the overheating of the waste gate module 100 can be prevented because the support bracket 200 and the waste gate module 100 are spaced apart from each other at a specific interval and heat is transferred through the plurality of coupling protrusions 210.

Furthermore, the waste gate module 100 can be stably supported through a plurality of coupling points because a plurality of the coupling protrusions 210 is provided, and the transfer of heat can be blocked because the insulator 400 is inserted.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for supporting a waste gate module, comprising:
    a support bracket connecting the waste gate module and a turbocharger housing; and
    a coupling protrusion formed on a face of the support bracket and that faces the waste gate module, the coupling protrusion having an end coupled to the waste gate module,
    wherein the waste gate module is coupled to the support bracket to face with an upper surface of the coupling protrusion, and a gap formed by a predetermined height of the coupling protrusion is provided between the waste gate module and remaining part of the support bracket except the coupling protrusion.

2. The apparatus of claim 1, wherein the support bracket has one end integrated and coupled with the turbocharger housing.

3. The apparatus of claim 1, wherein a plurality of the coupling protrusions is formed on a face of the support bracket.

4. The apparatus of claim 1, wherein:
    three coupling protrusions are formed on one face of the support bracket at predetermined intervals, and
    the coupling protrusions are disposed to correspond to vertices of a triangular shape.

5. The apparatus of claim 1, wherein a cross section of the coupling protrusion has a circular shape.

6. The apparatus of claim 1, wherein a bolt is disposed at a central part of an axial cross section of the coupling protrusion and the bolt is configured to be inserted into the waste gate module.

7. The apparatus of claim 3, wherein a plurality of grooves is formed on the face of the support bracket in which the coupling protrusions are formed.

8. The apparatus of claim 1, wherein an insulator for insulation or anti-vibration is further provided between faces of the coupling protrusion and the waste gate module which are coupled.

9. The apparatus of claim 8, wherein the insulator has a circular shape.

10. The apparatus of claim 1, wherein the support bracket is coupled to a compressor-side of the turbocharger housing.

11. The apparatus of claim 1, wherein the waste gate module is an electronic waste gate module and comprises a driving motor for driving a waste gate valve and a control unit for driving the driving motor.

* * * * *